W. R. HAGGART.
PACKING AND PROCESS OF MAKING SAME.
APPLICATION FILED JUNE 4, 1913.

1,076,282.

Patented Oct. 21, 1913.

WITNESSES:

INVENTOR
William R. Haggart
BY
Frank S. Busser
ATTORNEY.

UNITED STATES PATENT OFFICE.

WILLIAM R. HAGGART, OF PHILADELPHIA, PENNSYLVANIA.

PACKING AND PROCESS OF MAKING SAME.

1,076,282.   Specification of Letters Patent.   Patented Oct. 21, 1913.

Application filed June 4, 1913.  Serial No. 771,573.

*To all whom it may concern:*

Be it known that I, WILLIAM R. HAGGART, a citizen of the United States, residing at Philadelphia, county of Philadelphia, and State of Pennsylvania, have invented a new and useful Improvement in Packing and Processes of Making Same, of which the following is a full, clear, and exact description, reference being had to the accompanying drawings, which form a part of this specification.

The object of the invention is to provide a packing for piston rods and other parts of machines and engines which require a tight joint against the passage of steam, water, oil, gas and air. To meet all the requirements of such a packing, it should possess the following characteristics: It should have the utmost elasticity to permit it to be readily applied and to cause it to either compress or expand generally or locally to adapt itself to the conditions required to make a tight joint. It should retain this quality of elasticity for the maximum length of time. It should be so constructed that in all possible directions in which it may be bent by the engineer or workmen preliminary to its application to the stuffing box, it will present to the contacting parts of the machinery the same kind of wearing surface and the same kind and degree of elasticity; therefore it should also be capable of being removed from the stuffing box and bent in the several different directions in which it is capable of being bent and reapplied to the stuffing box in order to prolong its efficient life to its maximum: in other words, it should be symmetrical both in structure and with respect to the lines of greatest elasticity and resistance, and should be capable of expanding, compressing, and resisting wear, equally in four directions. It should be capable of being manufactured with the least possible labor and without waste of material.

Figure 1:
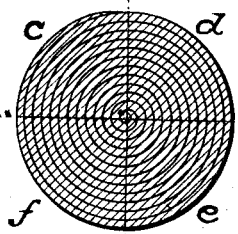
Figure 2:
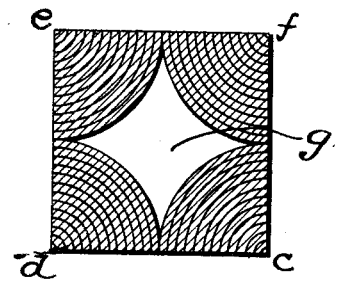
Figure 3:
Figure 4:
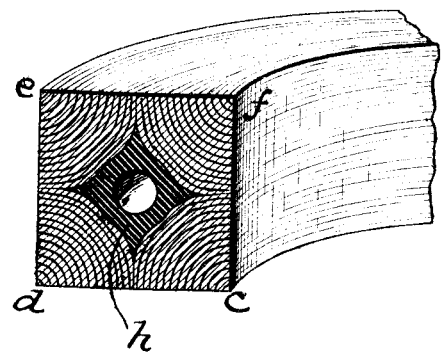

My invention consists in a packing which embodies the above characteristics and in the process of making the packing. The same may be fully understood by reference to the following description in connection with the accompanying drawings, in which:

Figure 1 is a transverse sectional view of a packing strip in the form of a roll but before being cut and formed into a packing embodying my invention. Fig. 2 is a similar view showing the partially completed packing formed by cutting sections from the roll shown in Fig. 1. Fig. 3 is a similar view of one form of core that may be applied to the packing of Fig. 2 to produce the finished packing. Fig. 4 is a perspective view of a section of the finished packing.

The packing belongs to that class of packing, well known in the art, composed of alternate layers of textile fibrous material and rubber or cement. In manufacturing the packing I take a sheet of textile fibrous material, as, for example, asbestos, or woven or knitted cotton, linen, canvas or duck, $a$, and apply thereto a coating of rubber or cement $b$. The compound sheet is then wound spirally to form a cylindrical roll, similar to that shown in Fig. 1, of a diameter substantially equal to the thickness of the packing designed to be ultimately formed. The roll, after being partly vulcanized, is then cut, in the direction of its length, and on radial lines, into four sections $c$, $d$, $e$, $f$, of equal size, thus forming four strips each having the shape in cross-section of a sector subtending an arc of ninety degrees. That is, each strip has the shape in cross-section of a mixed triangle whose two straight sides extend at right angles one to the other and whose third side is curved. The four sections are afterward assembled to form a perfectly square packing with a hollow interior, $g$, extending through the axis of the packing, formed by the opposing convexly curved faces of the four sections. Within this hollow interior is inserted a core of any desired form substantially filling the space between the sections. If desired, the four sections may be grouped around the core in the first instance.

I prefer to employ a core of rubber or other elastic material, and I prefer to make this core hollow throughout its length. Such a core, marked $h$, is shown separately in Fig. 3. The packing, after the sections $c$, $d$, $e$ and $f$ and the core $h$ have been assembled together, is compressed and vulcanized in the manner well known in the art, thereby forming a finished product, the component parts of which are securely and permanently united.

A packing of the construction described made by the process described possesses a maximum degree of elasticity and is capable of expansion and compression in all of the four directions in which it is desirable that a rectangular sectioned packing should be capable of yielding. Further, its elastic capacity is precisely equal in all four directions. These qualities enable the packing to be bent or curved, for application to the stuffing box, in any one of four directions and to perform its desired functions with equal efficiency no matter in which direction it is bent. There is therefore no possibility, as with many packings, of the engineer improperly preparing the packing for use. Further, the packing, after prolonged use, may be removed, bent in a different direction, and replaced, and it will have practically the efficiency of a new packing. It should be further noted that the packing on all faces presents a wearing surface intersecting, and substantially at right angles to, the layers of fibrous material and rubber, thereby presenting to the part or parts of the machinery with which the wearing face or faces contact a surface which has a maximum resistance to wear.

An important feature of the packing is its cheapness of manufacture. No type of packing formed of alternate layers of fibrous material and rubber can be more expeditiously and economically manufactured than that formed by rolling the rubber coated fibrous sheets into a roll. The operation is a simple one and there is absolutely no waste. This has been heretofore done and such a roll has been compressed into a square form in cross-section. But a packing so formed possesses inferior elasticity and inferior wearing qualities, as will be readily understood. In manufacturing my packing, the advantages above mentioned are retained, the forming of the roll being effected easily and expeditiously and with absolutely no waste. The only additional operation is the cutting of the roll longitudinally into four equal sections and the assemblage together of these sections around a core. This operation, also, involves no waste and may be easily and quickly carried out. The resultant final product possesses all the advantages, and in a much superior degree, of those packings, heretofore known in the art, in which the edges of the compound fabric and rubber layers extend angularly to the surfaces of the packing, but without the complications of manufacture, and particularly without the waste of material, that is involved in the manufacture of such packings. Another pronounced advantage of my improved packing is that in whatever position the wearing surface thereof may be applied to a reciprocatory part it will offer the same frictional resistance thereto in every direction.

While in the finished packing the corner sections present, with only a minor degree of distortion, the form, in cross-section, of a quarter of a circle, it will be understood that the extent to which they will be distorted from this form along their concealed curved sides will depend on factors such as the shape of the core and the extent of compression applied to the sections in course of manufacture.

It is not my intention to limit my invention to a packing in which will be preserved the ideal form of the concealed curved sides of the sections or the strict parallelism of the layers to this ideal curved form.

Having now fully described my invention, what I claim and desire to protect by Letters Patent is:

1. A packing rectangular in cross section and composed of four sections each of which constitutes in cross-section a sector of a substantially circular roll cut longitudinally on four radial lines subtending arcs of substantially ninety degrees, said sections being united together with the straight sides of adjacent sections in alinement and the angular corners of the several sections at the several corners of the packing.

2. A packing rectangular in cross-section and composed of four sections united together each of approximately the shape in cross section of a mixed triangle whose straight sides extend at right angles to each other and form substantially one half of the adjacent surfaces of two adjacent outer sides of the packing and whose curved side extends within the packing body between said two adjacent sides, the middle portion of each section composed of layers of fabric and rubber extending in the direction of its curved side and angularly to its outer straight sides.

3. A packing rectangular in cross-section and composed of four sections each of which constitutes a wedge-shaped quarter section of a spiral roll of fabric coated with rubber, said sections being united together with the rectangular corners of the several sections forming the several corners of the packing and with the straight sides of adjacent sections in alinement.

4. A packing comprising four similarly shaped sections, composed of layers of fabric and rubber, adapted if separated to be fitted together to form a strip substantially circular in cross section with the layers extending approximately concentric to the axis of the circle, said sections in the finished packing being united together with their curved surfaces within the body of the packing and their eight straight sides forming the four sides of the packing.

5. A packing comprising layers of fabric and rubber, said layers being arranged in four united groups to form a packing rectangular in cross-section, the opposite edges of the layers of each group terminating along adjacent halves of adjacent sides.

6. A packing rectangular-shaped in cross-section and comprising layers of fabric and rubber, each of which layers extends approximately in the form of an arc of a circle whose center is the nearest corner, said layers adjacent to their edges extending at approximately right angles to the nearest sides of the packing.

7. A packing rectangular in cross section and composed of a plurality of sections each of which constitutes in cross-section a part of a substantially circular roll, said sections being united together with their straight sides forming the outer wall of the packing, and their curved sides concealed within the packing.

8. A rectangular shaped packing comprising four corner sections composed of layers of fabric and rubber, each section having two straight sides extending at an angle to the adjacent edge portions of the layers of which the section is composed and forming substantially the two adjacent halves of two adjacent sides of the packing and having a curved side extending within the body of the packing between said two adjacent sides and in the direction of extension of said layers, and a longitudinally extending core in the space between the curved sides of the corner sections, said sections and core being secured together.

9. A rectangular shaped packing comprising four corner sections composed of layers of fabric and rubber, each section having two straight sides extending at an angle to the adjacent edge portions of the layers of which the section is composed and forming substantially the two adjacent halves of two adjacent sides of the packing and having a curved side extending within the body of the packing between said two adjacent sides and in the direction of extension of said layers, and a longitudinally extending flexible core, having a central longitudinally extending orifice, and filling the space between the sections and securely united thereto.

10. The process of making packing of rectangular shape in cross-section, which consists in rolling sheets of rubber coated fabric to form strips circular in cross-section, cutting each strip on radial lines to form four similar quarter sections, and uniting four of said quarter sections together with their four curved sides opposed and their eight straight sides forming the four outer straight sides of the packing.

11. The process of making packing of rectangular shape in cross-section, which consists in rolling sheets of rubber coated fabric to form strips circular in cross-section, cutting each strip on radial lines to form four similar quarter sections, assembling four of said sections around a flexible core with their curved sides against the core and the straight sides forming the outer faces of the packing adjacent to the respective corners, and compressing and securely uniting together said sections and the core.

12. The process of making packing of rectangular shape in cross section, which consists in rolling sheets of rubber coated fabric to form strips circular in cross-section, partly vulcanizing said strips, cutting each strip on radial lines to form four similar quarter sections, assembling four of said sections around a flexible core with their straight sides forming the sides of the packing and their curved sides against the core, and securely uniting said core and sections by compression and vulcanization.

In testimony of which invention, I have hereunto set my hand, at Philadelphia, on this 2nd day of June, 1913.

WILLIAM R. HAGGART

Witnesses:
E. E. WALL,
M. M. HAMILTON.